United States Patent [19]
Crocker

[11] Patent Number: 5,848,910
[45] Date of Patent: Dec. 15, 1998

[54] MULTI-PURPOSE LEVER ACTUATED CONNECTOR

[76] Inventor: C. Kent Crocker, 1360 Morson Rd., Jackson, Miss. 39209

[21] Appl. No.: 565,018

[22] Filed: Nov. 30, 1995

[51] Int. Cl.$^6$ .................................................. H01R 13/627
[52] U.S. Cl. ............................................ 439/358; 439/372
[58] Field of Search ................................... 439/253, 256, 439/257, 350, 358, 372, 592, 729, 822, 191, 210

[56] References Cited

U.S. PATENT DOCUMENTS

| | | | |
|---|---|---|---|
| 2,606,266 | 8/1952 | Duch | 219/1 |
| 3,030,681 | 4/1962 | Phillips | 24/81 |
| 3,090,029 | 5/1963 | Stroebel . | |
| 3,357,438 | 12/1967 | Castagna | 132/46 |
| 3,587,033 | 6/1971 | Brorein . | |
| 3,777,298 | 12/1973 | Newman | 439/191 |
| 4,040,697 | 8/1977 | Ramsay et al. | 439/822 X |
| 4,268,101 | 5/1981 | Stone | 439/729 X |
| 4,765,199 | 8/1988 | Andersen | 74/501 D |
| 4,939,340 | 7/1990 | Brill | 219/225 |
| 4,941,846 | 7/1990 | Guimond et al. | 439/256 X |
| 5,122,076 | 6/1992 | Pitts | 439/372 X |
| 5,195,523 | 3/1993 | Cartmell et al. | 439/729 X |
| 5,259,780 | 11/1993 | Morrisey, III | 439/292 |
| 5,318,459 | 6/1994 | Shields | 439/527 |
| 5,366,392 | 11/1994 | Raloff | 439/889 |

FOREIGN PATENT DOCUMENTS

| | | | |
|---|---|---|---|
| 0931329 | 2/1948 | France | 439/822 |

*Primary Examiner*—Khiem Nguyen
*Attorney, Agent, or Firm*—L. Jager Smith, Jr.

[57] ABSTRACT

A connector adapted for use in connecting hoses, tubes, wire, cable and the like to transfer flows, currents or signals in electrical, optical, gaseous, liquid or solid flow applications. The connector may also be employed to make connections with stock such as threaded rods or machine screws. The connector employs a central conduit, of a selected shape, and one or more lever members disposed about the central conduit. An elastic binding is provided to provide force to bias the lever members into a gripping position, thereby securing a connection made when a male member is inserted into the central conduit. A user applies force to a releasing end of the lever members, thereby causing the gripping ends of the lever members to open and allowing the male member to be withdrawn or inserted.

8 Claims, 7 Drawing Sheets

MULTI-PURPOSE LEVER ACTUATED CONNECTOR

FIELD OF THE INVENTION

The present invention relates to a novel connector that may be used in connecting hoses, tubes, wire, cable and the like to transfer flows, currents, or signals in electrical, optical, gaseous, liquid or solid flow applications. Another embodiment of the connector may be used for the purpose of clamping stock such as rods, tubes, pipe and the like, having smooth, threaded or otherwise engraved surfaces.

BACKGROUND OF THE INVENTION

There is a large number of different types of connectors that can be used to connect cables, tubes, hoses and wires that allow for the connection to be properly made and yet still allow for disconnection as the need arises. Many of these connectors, such as the one disclosed in U.S. Pat. No. 3,587,033, use threaded mating surfaces and require that the connection be screwed together. The disadvantage of these connectors is that the user must unscrew one half of the connector before the connection can be broken.

A similar need to perform an unscrewing operation on the connector before the connection can be broken is demonstrated by the connector disclosed in U.S. Pat. No. 5,366,392. In that disclosure, a male element having a locking groove is placed into a female element having an integral locking screw. The locking screw engages the locking groove on the male element. To break the connection, the locking screw must be backed out from engagement of the locking groove.

Other connectors do not require a screwing action for engagement or disengagement. The coupler disclosed in U.S. Pat. No. 4,765,199 employs a female member including a plurality of flexible fingers which, when the connection is engaged, are disposed about a male member. The flexible fingers have rounded tips which engage a groove formed in the male member. A locking ring slides over the fingers to keep them in place while the connection is made. Repeated engagement and disengagement of the connection may subject the flexible fingers to fatigue stress.

The connector disclosed in U.S. Pat. No. 5,259,780 employs gender-neutral halves having molded plastic surfaces that interlock with one another when a connection is made. The connection is broken simply by pulling the halves apart.

The present invention provides advantages over the prior art, in that a screwing motion is not required to engage or disengage the connection, the structural members of the connection are not subjected to fatigue loads during normal use, and the connection cannot be broken during normal operation without the user's application of a release force on the connector. Thus, the present invention provides for an easy and quick engagement and disengagement of the connection, while avoiding fatigue stress on the connector that can ultimately cause degraded connections, and while insuring the connection is not broken through inadvertent tensile stress in the connected members.

It is accordingly a feature of the present invention that a connector is provided that can be easily engaged and disengaged through a simple gripping motion. It is a further feature of the invention that the connector remains connected during normal use, without pulling apart, when the connection is subject to tensile stress. A further feature of the invention is that connection and disconnection of the connector does not subject structural components of the connector to fatigue stress, thereby resulting in a longer life of the connector.

SUMMARY OF THE INVENTION

The present connector employs one or more lever members that are disposed about a central conduit. The central conduit serves as a fulcrum for the lever members. The lever members have a gripping end that extends beyond the central conduit and which engages a male member used to complete a connection. An elastic binding is provided over the lever members that provides force to bias the lever members into gripping contact with the inserted male member.

The connector thus described is operated by the user applying force to the ends of the lever members opposite the gripping end. Force so applied causes the gripping ends of the lever members to pivot into an open position, allowing insertion of a male member. Once the male member is properly inserted, the user releases the levers, and the elastic binding causes the gripping ends of the lever members to clamp down onto the male member. The central conduit and the lever members may be provided with matching mating grooves, such as threads, that will keep the lever members and central conduit from sliding with respect to one another during normal operation of the connector.

The preferred embodiment of the invention described herein employs a cylindrically shaped central conduit and two opposing lever members. The present invention is not limited to this embodiment, however, and one skilled in the art may easily adapt the invention for use with many configurations of the central conduit and lever arms. For example, an embodiment may use a central conduit having a rectangular cross section and four lever members disposed on each side of the conduit, or disposed on the corners and having an angular shape. The central conduit may generally be constructed having a cross sectional form of a circle, oval, polygon, or for some applications, an irregular shape. The lever configuration used with any given central conduit shape may be easily determined, according to the needs of the particular application, by one skilled in the connector art.

The connectors described herein may be provided with a flexible external insulating coating, such as is commonly found on wiring or coaxial cable, to protect the elastic binding and to give a finished appearance to the connector. Where such an insulating coating is used, it should cover the release ends of the lever members. The insulating coating should be flexible enough, and formed with sufficient additional size, at the location of the release ends of the lever members, so that the insulating coating does not cause more inward force on the release ends of the lever members than can be overcome by the gripping force provided by the elastic binding.

BRIEF DESCRIPTION OF THE DRAWINGS

The organization and manner of the structure and operation of the invention, together with further advantages thereof, may be best understood by reference to the following description, taken in connection with the accompanying drawings, wherein like reference numerals identify like elements in which.

DETAILED DESCRIPTION OF SPECIFIC EMBODIMENTS OF THE INVENTION

Figure 1A:
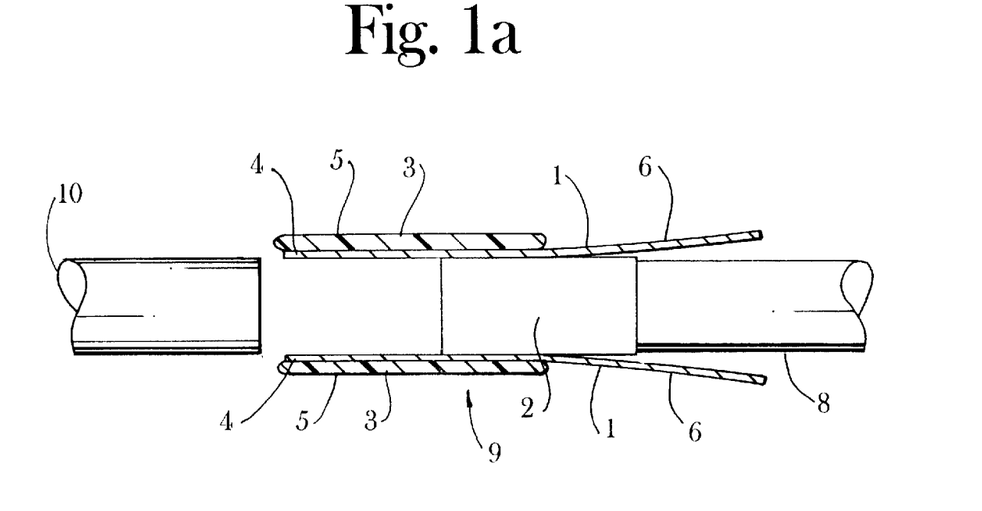
FIGS. 1a and 1b are cross-sectional views of an embodiment of the connector in the closed and open positions, respectively, showing the central conduit, the lever members, and the elastic binding.

Referring to FIG. 1a, a cross section of a connector 9 in accordance with the present invention is shown. In FIG. 1a, the connector 9 is shown in the closed or gripping position. In this embodiment of the invention, two lever members 1 are disposed on either side of a central conduit 2. A lead 8 feeds into the central conduit 2 and is rigidly affixed to the inside surface of central conduit 2. The lead 8 may be an electrical wire, a tube, hose, cable, or other stock desired to be connected. In this embodiment, the lever members 1 are formed such that there is a release end 6 slightly flaring away from the central conduit 2, and a gripping end 5 that is adapted to accepted a male member 10 similar to lead 8. In this embodiment, the inside surface of the gripping ends 5 of the lever members 1 are provided with threads 4 to facilitate a secure connection with the male member 10. An elastic binding 3 is disposed around the outside surfaces of lever members 1. Elastic binding 3 provides force to bias the gripping ends 5 of lever members 1 to the closed position. In the preferred embodiment, elastic binding 3 covers the lever members 1 from the ends of lever members 1 farthest from the central conduit 2 at gripping ends 5, approximately to the point of fulcrum of lever members 1 on central conduit 2.

Figure 1B:
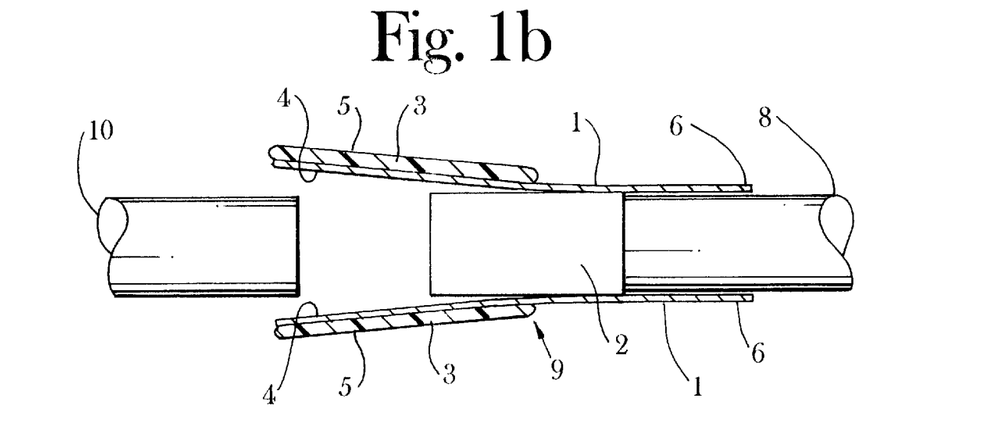

In FIG. 1b, a view of connector 9 similar to that of FIG. 1a is presented, except that the connector 9 is shown in the open position. This configuration is achieved by a user applying force on release ends 6 of the lever members 1, causing the gripping ends 5 of the lever members 1 to diverge from one another. In the open position, the male member 10 may be introduced into the central conduit 2 to effect the connection of male member 10 with lead 8.

Figure 2:
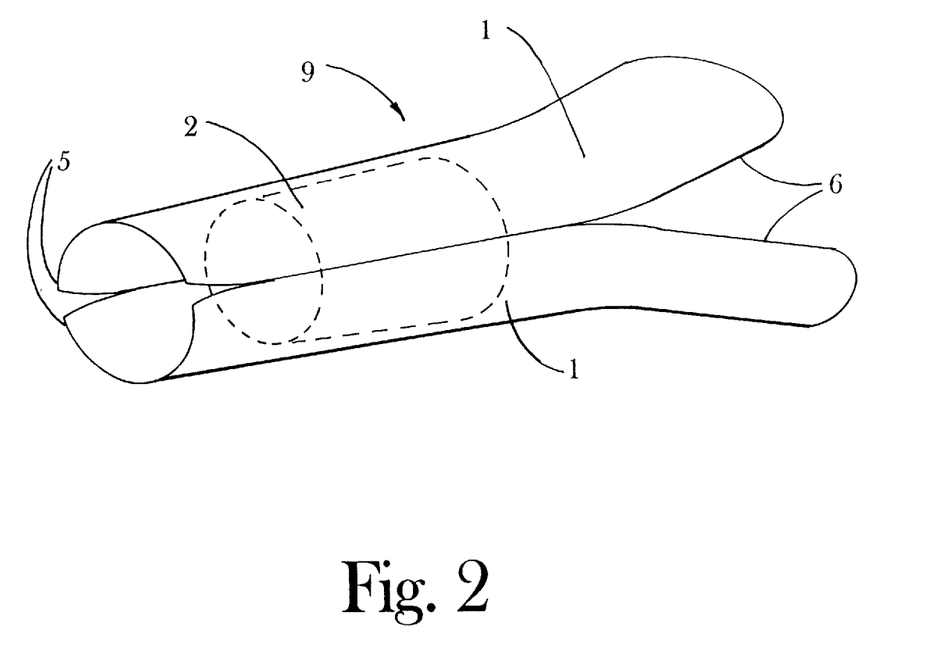
FIG. 2 is a perspective illustration of an embodiment of the connector having two lever members and the central conduit, but not illustrating the elastic binding.

Turning now to FIG. 2, a perspective view of an embodiment of the connector 9 in the gripping position is shown. FIG. 2 illustrates the preferable configuration of connector 9 using two lever members 1. The lever members 1 illustrated in FIG. 2 are of generally semicircular cross section, and the central conduit 2 has a cylindrical shape. The invention is not limited to applications using two lever members 1, however, nor is it limited to central conduits 2 and lever members 1 adapted for use with male members having circular cross sections. In applications where one lever member 1 is desired to be used, all or a portion of the central conduit may be extended outward in the direction of the release end 6 of the lever member 1 in order to provide the user with a surface upon which to put a force opposing the force applied to the single release end 6.

Figure 3:
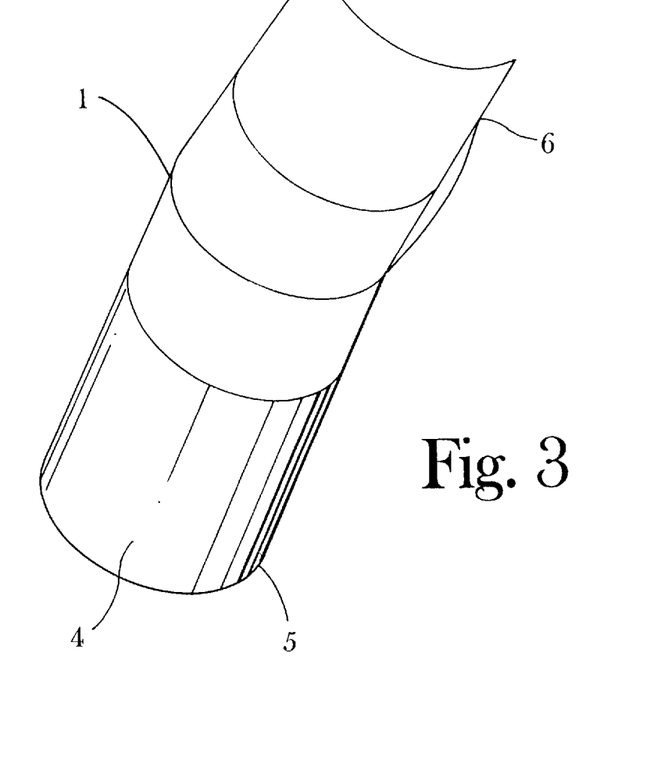
FIG. 3 is a perspective illustration of a typical lever member having a generally semicircular cross section and threads on the inside surface of the gripping end of the lever member.

In FIG. 3, a typical lever member 1 is shown. Threads 4 are shown on the surface of the gripping end 5 of lever member 1 which are adapted to hold a male member inserted into the connector. In this embodiment, these threads 4 extend toward the release end 6 of lever member 1 far enough such that matching threads on central conduit 2 may be engaged.

Figure 4:
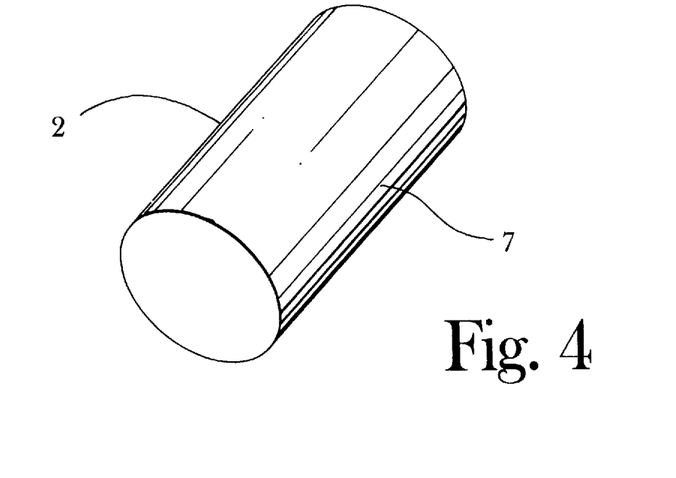
FIG. 4 is a perspective illustration of the central conduit, having a cylindrical shape, and having a threaded exterior surface.

In FIG. 4, central conduit 2 is shown. In this embodiment, threads 7 on the outside surface of central conduit 2 are provided. These threads 7 will engage threads 4 on lever member 1, as illustrated in FIG. 3. The engagement of threads 7 and 4 on central conduit 2 and lever member 1, respectively, serves to prevent slippage of lever member 1 on Conduit 2 during operation of connector 9.

Figure 5:
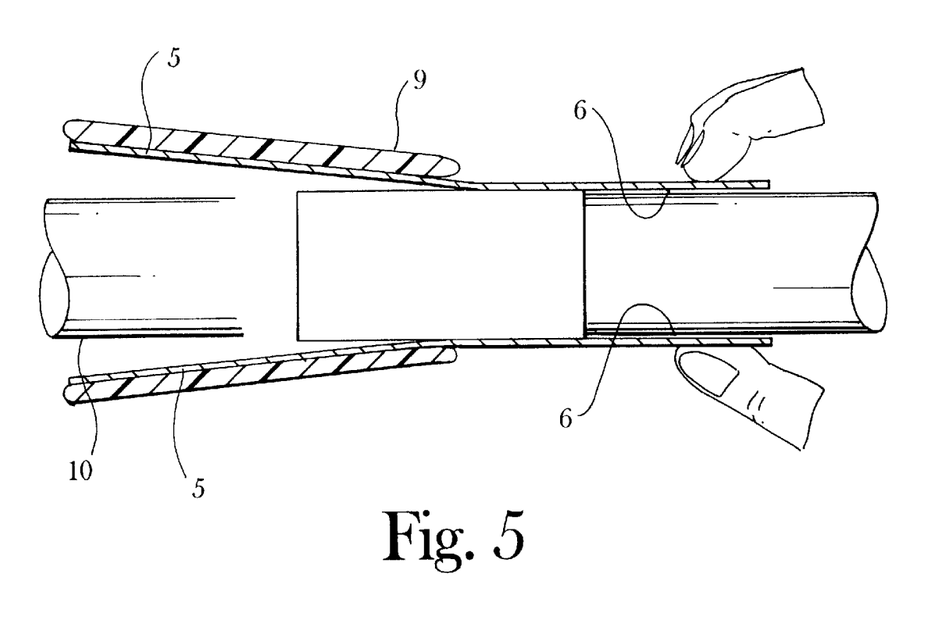
FIG. 5 is an illustration of the manner of use of one embodiment of the connector, showing force being applied to the lever members causing the gripping ends of the lever members to open.

In FIG. 5, use of the connector 9 is illustrated. The user presses the release ends 6 of lever members 1 together, causing the gripping ends 5 of the lever members 1 to diverge, allowing a male member 10 to be inserted.

Figure 6A:
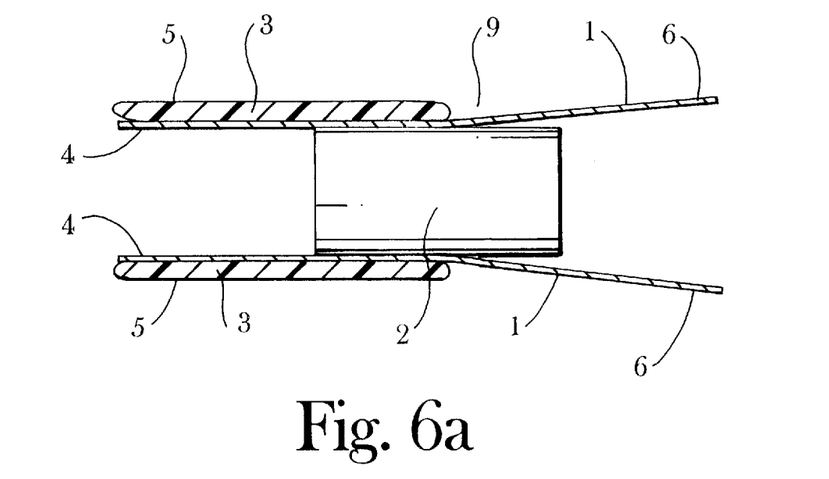
FIGS. 6a and 6b are illustrations of an embodiment of the invention in use as a quick release clamp for threaded stock, in the gripping and open positions, respectively.

In FIG. 6a, a cross-sectional view of a connector 9 useful as a quick release clamp is shown. In FIG. 6a, the connector 9 is shown in the closed or gripping position. In this embodiment of the invention, two lever members 1 are disposed on either side of a central conduit 2. The lever members 1 are formed such that there is a release end 6 slightly flaring away from the central conduit 2, and a gripping end 5 that is adapted to accepted a threaded stock. The inside surface of the gripping ends 5 of the lever members 1 are provided with threads 4 to facilitate a secure connection with the threaded stock. An elastic binding 3 is disposed around the outside surfaces of lever members 1. The elastic binding 3 provides force to bias the gripping ends 5 of lever members 1 to the closed position. This embodiment of the invention may be used to replace a standard nut on threaded stock, such as a machine screw. This embodiment of the invention will permit a connection to be broken without the use of tools, as might be required with a standard nut.

Figure 6B:
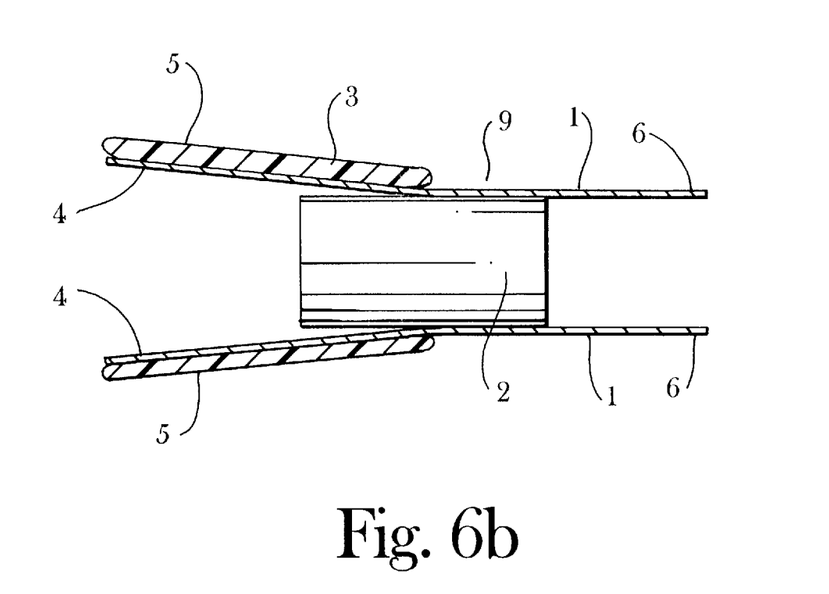

In FIG. 6b, a view of connector 9 useful as a quick release clamp similar to that of FIG. 6a is presented, except that the connector 9 is shown in the open position. This configuration is achieved by a user applying force on release ends 6 of the lever members 1, causing the gripping ends 5 of the lever members 1 to diverge from one another. In the open position, a threaded stock may be introduced into the central conduit 2 to effect a connection.

Figure 7:
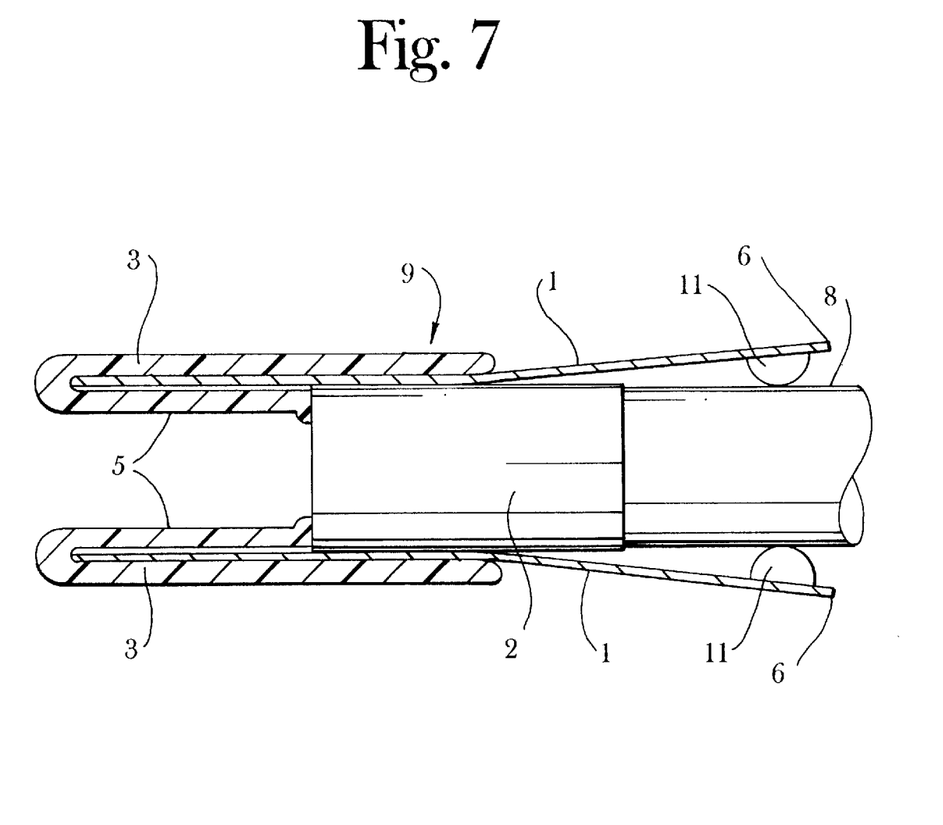
FIG. 7 is a cross-sectional illustration of an embodiment of the connector that may be used in connecting hoses, pipes or tubes carrying fluids, either gaseous or liquid.

In FIG. 7, a cross-sectional view of a connector 9 useful for connecting hoses, pipes or tubes is shown. In FIG. 7, the connector 9 is shown in the closed or gripping position. In this embodiment of the invention, two lever members 1 are disposed on either side of a central conduit 2. A lead 8, in this embodiment, the hose pipe or tube desired to be connected, feeds into the central conduit 2 and is rigidly affixed to the inside surface of central conduit 2. The lever members 1 are formed such that there is a release end 6 slightly flaring away from the central conduit 2, and a gripping end 5 that is adapted to accepted another lead desired to be connected with lead 8. An elastic binding 3 is disposed around the outside surfaces of lever members 1, and the elastic binding 3 wraps over the gripping end 5 of the lever members and covers the inside surface of the gripping end of the lever members. The elastic binding covering the inside surface of the lever members may be formed with integral mating grooves, such as threads, to improve the connection of the connector with a male member. Elastic binding 3 provides force to bias the gripping ends 5 of lever members 1 to the closed position. A ridge 11 is formed on the inside surface of the release ends 6 of lever members 1. Ridge 11 serves to cause the release ends 6 of lever members 1 to be forced outward in the event lead 8 expands from pressure, thereby applying additional gripping force on the connected lead at the gripping ends 5 of lever members 1.

Figure 8:
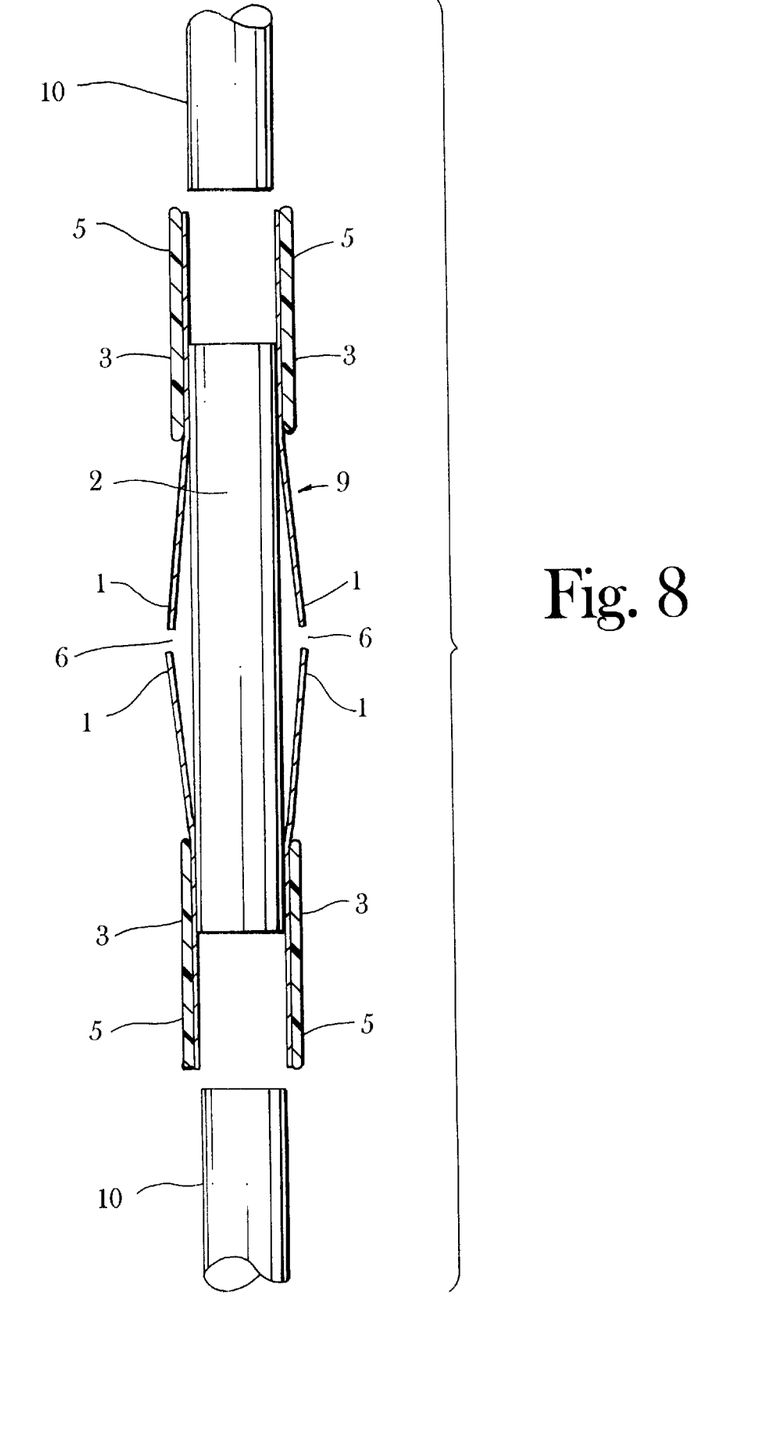
FIG. 8 is a cross-sectional illustration of an embodiment of the invention that may be used as a coupler. In this embodiment, sets of opposed lever members are provided on opposite ends of an elongated central conduit.

In FIG. 8, an embodiment of the invention is shown that may be used to couple together two male members. In FIG. 8, the connector 9 is shown in the closed or gripping position at each of its two ends. In this embodiment of the invention, two sets of lever members 1 are disposed on either side of a central conduit 2 at both ends of the central conduit. The lever members 1 are formed such that there is a release end 6 slightly flaring away from the central conduit 2, and a gripping end 5 that is adapted to accepted a male member 10. The inside surface of the gripping ends 5 of the lever members 1 may be provided with threads to facilitate a secure connection with the male member 10. An elastic binding 3 is disposed around the outside surfaces of each set of lever members 1. Elastic bindings 3 provide force to bias the gripping ends 5 of lever members 1 to the closed position. The function of this embodiment of the invention is similar to that of the connector illustrated in FIGS. 6a and 6b, except that this embodiment will connect to two different male members.

From the foregoing detailed description of specific embodiments of the invention, it should be apparent that a novel and versatile connector has been disclosed. While specific embodiments of the invention have been described in detail, it is to be understood that various alterations, substitutions, and modifications can be made therein without departing from the spirit and scope of the present invention as defined in the appended claims.

I claim:

1. A connector, which comprises:
   a. a central conduit having an inside surface and an outside surface;
   b. at least one lever member, having an inside surface pivotally bearing on the outside surface of the central conduit, an outside surface, a gripping end, and a releasing end;
   c. an elastic binding having an inside surface disposed on the outside surface of the lever member, and an outside surface;
   d. a flexible insulating coating covering both the outside surface of the elastic binding and the outside surface of the lever member.

2. The connector according to claim 1, additionally comprising a lead rigidly affixed to the inside surface of the central conduit.

3. The connector according to claim 1 wherein the inside surface of the gripping end of the lever member is threaded to mate with a threaded male member desired to be gripped with the connector.

4. The connector according to claim 1, wherein the outside surface of the central conduit and the inside surface of the lever member are both provided with a plurality of mating grooves to keep the central conduit and lever member from sliding with respect to one another.

5. The connector according to claim 1, wherein the elastic binding is extended to wrap over the outside surface of the lever member and additionally extends over the inside surface of the gripping end of the lever member and over the inside surface of the central conduit.

6. The connector according to claim 5, wherein the elastic binding is formed with integral mating grooves to facilitate connection with a male member having similar grooves.

7. The connector according to claim 5, further comprising a ridge on the inside surface of the release end of the lever member.

8. A connector, which comprises:
   a. a central conduit having an inside surface, an outside surface, and two ends;
   b. at least one lever member located at each end of the central conduit, each lever member having an inside surface pivotally bearing on the outside surface of the central conduit, an outside surface, a gripping end and a release end;
   c. elastic bindings having inside surfaces disposed on the outside surface of each lever member, and outside surfaces;
   d. a flexible insulating coating covering both the outside surfaces of the elastic binding and the outside surface of the lever member.

\* \* \* \* \*